Sept. 10, 1940.    S. R. ALLAN    2,214,649
FLUSHED ELECTRICAL PRECIPITATOR
Filed Jan. 27, 1939
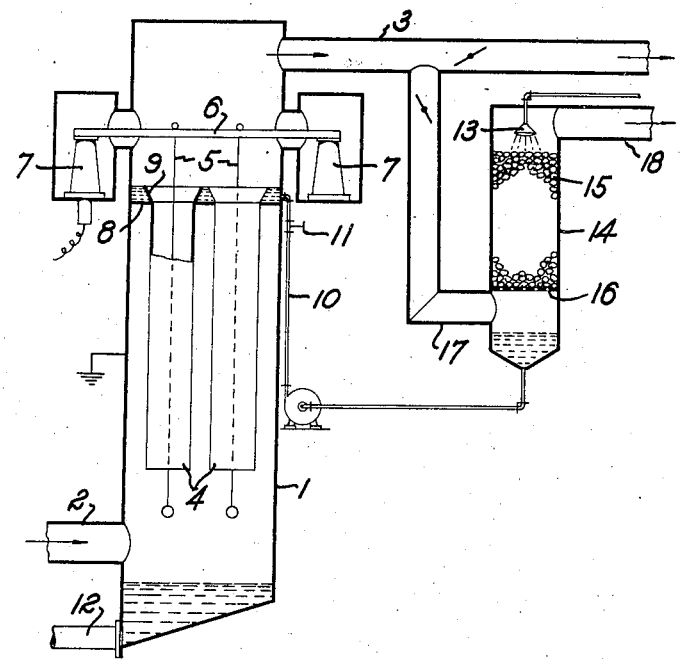
Inventor:
Stuart R. Allan
By Potter, Pierce + Scheffler
Attorneys.

Patented Sept. 10, 1940

2,214,649

UNITED STATES PATENT OFFICE 2,214,649

FLUSHED ELECTRICAL PRECIPITATOR

Stuart R. Allan, Somerville, N. J., assignor to Research Corporation, New York, N. Y., a corporation of New York Application January 27, 1939, Serial No. 253,187

1 Claim. (Cl. 183—7)

This invention relates to electrical precipitation and particularly to improvements in the operation of electrical precipitators of the water-flushed electrode type.

It has been found heretofore that in the electrical precipitation of suspended particles from gases it is frequently desirable to maintain a film of water over the entire surface of the collecting electrode. For example, in the cleaning of gases which carry suspended particles that build up on the collecting electrodes in the form of hair-like tendrils, the localization of the electric field which results from such formations not only reduces the capacity of the precipitator for a given efficiency of removal, but also reduces the absolute efficiency of removal irrespective of the volume of gas handled. This formation of tree-like or furry deposits may be prevented by flushing the surface of the electrode with a continuously maintained film of water.

This method of operation has been very successful in increasing the efficiency of electrical precipitation of suspended particles from certain industrial gases, such as blast furnace gases, but serious difficulties have arisen due to the corrosion of the metallic members in contact with the water used for flushing. A particularly serious disadvantage arising from this corrosion has been the difficulty of maintaining a uniform flow of water over the surfaces of the collecting electrodes because of corrosion of the regulating weirs. The corrosion difficulties have been aggravated, where, because of local conditions, sea water has been used for the flushing of the electrodes, but even with fresh water serious disturbances in effective control of the flushing water has resulted from the corrosion of weirs and other metallic members.

It has now been found that the difficulties from corrosion, even when using sea water for flushing, may be eliminated by removal of dissolved oxygen from the water used for flushing. An effective method of removing the dissolved oxygen comprises exposing the oxygen containing water in an extended surface to a substantially oxygen-free gas, for example, by spraying the water through the gas or by bubbling the gas through the water. When the precipitator is being used for the cleaning of substantially oxygen-free gases, such as blast furnace gases, the gases themselves, either before or after the cleaning operation, may be utilized for reducing the oxygen content of the water. Other methods of removing oxygen from the water, such as subjecting the water to low pressures, with or without heating, and contacting the water with substances such as iron turnings, may also be used.

When gases relatively free from oxygen are being treated, the flushing water from the precipitator is substantially oxygen-free and may frequently be recirculated over the collecting electrode substances to an extent depending on the accumulation of dissolved solids and suspended solids which will not readily settle out.

A principal object of the invention is the provision of a method of operating water-flushed electrical precipitators whereby the corrosion of metallic members in contact with the water may be substantially eliminated, and this object is attained by supplying to the electrode flushing means water which is substantially free from dissolved oxygen.

The principles of the invention are illustrated in the accompanying drawing.

In the drawing, 1 is the casing of an up-draft precipitator which has a lower inlet 2 for raw gas and an outlet 3 at its upper end for the cleaned gas, the direction of gas flow being indicated by the arrows. The collecting electrodes comprise a plurality of pipes 4, and the discharge electrode system includes filamentary electrodes 5 located at the axis of each collecting electrode pipe 4, the discharge electrodes being suspended from a high tension framework 6 which is mounted on insulators 7. The collecting electrodes are mounted on and supported by an upper header 8 which extends across the upper portion of casing 1. The upper portions 9 of collecting electrode pipes 4 cooperate with header 8 to provide a reservoir for holding the flushing water that flows down the inner surfaces of the pipes 4, the portions 9 forming weirs whereby a uniform supply of wash water to the entire inner surface of each pipe may be provided. The wash water is supplied through pipe 10 and its volume is controlled by valve 11 which may be automatically operated in response to variations in the level of the water in the reservoir. An outlet or drain 12 is provided at the bottom of casing 1, and the sludge or suspension which drops from the collecting electrodes 4 may be drawn off, either continuously or intermittently, through this drain.

The wash water, or the make-up water if a portion of the wash water is recirculated from the bottom of the precipitator after the suspended solids have settled out, is sprayed through spray head 13 into the top of a container 14, containing a body of extended surface filling material 15 supported on a perforated plate 16.

Clean gas from the precipitator is supplied to chamber 14 through inlet 17 and after sweeping over the extended surface of the wash water in the chamber, leaves through outlet 18. By exposure of the water in thin films to a gas having a very low or no oxygen content, the dissolved oxygen in the water is very rapidly removed and the water collected in the bottom of chamber 14 will have a dissolved oxygen content corresponding to the partial pressure of the oxygen in cleaned gas, that is, practically nil. This water is then supplied to the reservoir in the electrical precipitator through pipe 10. By this method of operation, corrosion of the weir members 9 is found to be substantially eliminated even when using sea water for flushing.

It will thus be seen that the invention comprises a method of operating water flushed precipitators wherein the collecting electrodes are supplied with water substantially free from dissolved oxygen, and, more particularly, in the cleaning of gases substantially free from oxygen, the removal of dissolved oxygen from the flushing water being effected by contacting the water with the gases of low oxygen content.

I claim:

In the separation of suspended matter from gases containing substantially no oxygen by passing the gas through an electrical precipitator, the improvement which comprises removing dissolved oxygen from water by intimately contacting the water with the gas undergoing treatment in a zone apart from the zone of electrical precipitation and flushing the collecting electrode surfaces of the precipitator with water from which dissolved oxygen has been removed by said contact with the gas.

STUART R. ALLAN.